(12) United States Patent
Maynard

(10) Patent No.: US 12,270,404 B2
(45) Date of Patent: Apr. 8, 2025

(54) GAS-DRIVEN GENERATOR SYSTEM COMPRISING AN ELONGATE GRAVITATIONAL DISTRIBUTION CONDUIT COUPLED WITH A GAS INJECTION SYSTEM

(71) Applicant: Mark J. Maynard, Easthampton, MA (US)

(72) Inventor: Mark J. Maynard, Easthampton, MA (US)

( * ) Notice: Subject to any disclaimer, the term of this patent is extended or adjusted under 35 U.S.C. 154(b) by 9 days.

(21) Appl. No.: 17/846,004

(22) Filed: Jun. 21, 2022

(65) Prior Publication Data

US 2022/0333603 A1    Oct. 20, 2022

Related U.S. Application Data

(63) Continuation-in-part of application No. 17/229,477, filed on Apr. 13, 2021, now abandoned, and a
(Continued)

(51) Int. Cl.
| | |
|---|---|
| *F04D 17/12* | (2006.01) |
| *F02C 1/00* | (2006.01) |

(Continued)

(52) U.S. Cl.
CPC ............. *F04D 17/12* (2013.01); *F04B 25/00* (2013.01); *F04B 39/16* (2013.01); *F04B 41/06* (2013.01);
(Continued)

(58) Field of Classification Search
CPC ...... F04D 13/12; F04D 17/12; F04D 29/5866; F04D 29/002; F04D 29/5833; F25B 1/10;
(Continued)

(56) References Cited

U.S. PATENT DOCUMENTS

| 211,143 A | 1/1879 | Fogarty |
|---|---|---|
| 261,605 A | 7/1882 | Hill |

(Continued)

FOREIGN PATENT DOCUMENTS

| CN | 1277928 A | 12/2000 |
|---|---|---|
| CN | 101149039 A | 3/2008 |

(Continued)

OTHER PUBLICATIONS

Israel Patent Office, Notice of Deficiencies for Patent Application 276061, dated Oct. 3, 2022, 3 pages.
(Continued)

*Primary Examiner* — Charles G Freay
*Assistant Examiner* — Benjamin Doyle
(74) *Attorney, Agent, or Firm* — Nutter McClennen & Fish LLP

(57) ABSTRACT

An gas-driven generator system for generating electric power from movement of a working liquid. The system includes a gas-driven generator that includes a liquid turbine system fluidically interposed between the lower end of an elongated gravitational distribution conduit and the lower ends of plural elongated buoyancy conduits. A heavy working liquid flows from the upper ends of the buoyancy conduits and is fed into the upper end of the elongated gravitational distribution conduit. Working liquid flows down the elongated gravitational distribution conduit to actuate the liquid turbine system. An injection of refrigerant gas into the working liquid in the plural elongated buoyancy conduits induces upward flow of the working liquid. The system includes a solar thermal heating system fluidically coupled to heat exchangers that transfer heat collected by the solar thermal heating system to the working liquid through a thermal transfer fluid circuit.

18 Claims, 3 Drawing Sheets

Related U.S. Application Data continuation-in-part of application No. 16/861,987, filed on Apr. 29, 2020, now Pat. No. 10,968,883, said application No. 17/229,477 is a continuation of application No. 16/250,736, filed on Jan. 17, 2019, now Pat. No. 10,989,110, said application No. 16/861,987 is a continuation of application No. 16/115,531, filed on Aug. 28, 2018, now Pat. No. 10,683,839.

(60) Provisional application No. 63/212,914, filed on Jun. 21, 2021, provisional application No. 62/618,720, filed on Jan. 18, 2018, provisional application No. 62/550,836, filed on Aug. 28, 2017.

(51) Int. Cl.
| | |
|---|---|
| *F04B 25/00* | (2006.01) |
| *F04B 39/16* | (2006.01) |
| *F04B 41/06* | (2006.01) |
| *F04D 13/12* | (2006.01) |
| *F04D 25/16* | (2006.01) |
| *F04D 29/00* | (2006.01) |
| *F04D 29/58* | (2006.01) |
| *F25B 1/00* | (2006.01) |
| *F25B 30/06* | (2006.01) |

(52) U.S. Cl.
CPC ............ *F04D 25/16* (2013.01); *F04D 29/002* (2013.01); *F04D 29/5833* (2013.01); *F04D 29/5866* (2013.01); *F25B 30/06* (2013.01); *F02C 1/00* (2013.01); *F04D 13/12* (2013.01); *F04D 29/5826* (2013.01); *F25B 1/00* (2013.01); *F25B 2400/061* (2013.01)

(58) Field of Classification Search
CPC ............ F25B 2309/061; F25B 2400/13; F25B 9/008; F25B 2400/072; F25B 40/00; F25B 2400/23; F25B 1/04; F25B 2309/06; F25B 25/005; F25B 30/02; F25B 31/002; F25B 40/04; F25B 41/39; F25B 43/02; F25B 9/004; F25B 13/00; F25B 2400/01; F25B 2400/16; F25B 2600/17; F25B 2600/2509; F25B 2700/21152; F25B 31/006; F25B 40/02; F25B 45/00; F25B 49/022; F25B 11/00; F25B 11/02; F25B 11/04; F25B 1/00; F25B 21/00; F25B 21/04; F25B 2339/041; F25B 2339/047; F25B 2341/0012; F25B 2341/0014; F25B 2341/0015; F25B 2400/04; F25B 2400/0411; F25B 2400/14; F25B 2400/15; F25B 2500/17; F25B 2600/02; F25B 2600/025; F25B 2600/0253; F25B 2600/026; F25B 2700/19; F25B 27/00; F25B 30/00; F25B 31/008; F25B 39/028; F25B 41/00; F25B 41/22; F25B 41/385; F25B 49/027; F25B 5/02; F25B 7/00; F25B 30/06
USPC ........... 417/248, 243, 108–117; 60/495, 496, 60/641.6; 290/43, 52, 54
See application file for complete search history.

(56) References Cited

U.S. PATENT DOCUMENTS

| | | | |
|---|---|---|---|
| 366,551 A | 7/1887 | Baker | |
| 688,520 A | 12/1901 | Hill | |
| 1,339,137 A | 5/1920 | Rogers | |
| 2,280,845 A | 4/1942 | Parker | |
| 2,298,984 A | 10/1942 | Stinson et al. | |
| 2,725,181 A | 11/1955 | Lamberton | |
| 2,849,173 A | 8/1958 | Surdy | |
| 3,002,923 A | 10/1961 | Barker et al. | |
| 3,014,639 A | 12/1961 | Gwinner | |
| 3,232,524 A | 2/1966 | Rice | |
| 3,360,926 A | 1/1968 | Parr | |
| 3,375,664 A | 4/1968 | Wells, Jr. | |
| 3,601,979 A | 8/1971 | Singer | |
| 3,608,311 A | 9/1971 | Roesel, Jr. | |
| 3,658,442 A | 4/1972 | Heitmann et al. | |
| 3,850,817 A | 11/1974 | Barthel | |
| 3,984,698 A | 10/1976 | Brewer | |
| 3,988,897 A | 11/1976 | Strub | |
| 4,028,893 A * | 6/1977 | Shaw | F03B 17/02 60/649 |
| 4,038,826 A * | 8/1977 | Shaw | F03B 17/02 60/641.14 |
| 4,041,710 A * | 8/1977 | Kraus | F01K 27/005 60/673 |
| 4,054,031 A | 10/1977 | Johnson | |
| 4,097,202 A | 6/1978 | Price | |
| 4,135,364 A | 1/1979 | Busick | |
| 4,196,590 A * | 4/1980 | Fries | F03B 17/02 60/649 |
| 4,266,402 A | 5/1981 | Pruett | |
| 4,326,132 A | 4/1982 | Bokel | |
| 4,392,062 A * | 7/1983 | Bervig | F03B 17/005 417/90 |
| 4,430,858 A * | 2/1984 | Shaw | F03B 17/02 417/159 |
| 4,498,294 A * | 2/1985 | Everett | F03B 17/02 415/7 |
| 4,742,242 A | 5/1988 | De Shon | |
| 4,767,938 A * | 8/1988 | Bervig | F03B 17/005 290/1 R |
| 4,800,727 A | 1/1989 | Petrick | |
| 4,832,578 A | 5/1989 | Putt | |
| 4,947,647 A | 8/1990 | Jensen | |
| 4,947,655 A | 8/1990 | Shaw | |
| 5,461,861 A | 10/1995 | Wenzel | |
| 5,685,147 A * | 11/1997 | Brassea | F03B 17/02 60/495 |
| 5,899,066 A | 5/1999 | Brassea-Flores | |
| 6,051,891 A * | 4/2000 | Surodin | F03G 6/001 290/55 |
| 6,203,285 B1 | 3/2001 | Wagner | |
| 6,223,532 B1 * | 5/2001 | Brassea-Flores | F03B 17/02 60/671 |
| RE37,603 E | 3/2002 | Coney | |
| 6,447,243 B1 | 9/2002 | Kittle | |
| 6,695,591 B2 | 2/2004 | Grimmer | |
| 6,990,809 B2 * | 1/2006 | Abouraphael | F03B 17/02 60/495 |
| 7,222,487 B1 | 5/2007 | Hinkley | |
| 7,226,895 B2 | 6/2007 | Xiang | |
| 7,584,610 B2 | 9/2009 | Ziegenfuss | |
| 8,008,796 B2 | 8/2011 | Muchow | |
| 8,397,496 B2 | 3/2013 | Frank | |
| 8,456,027 B1 | 6/2013 | Seehorn | |
| 8,572,959 B2 | 11/2013 | Ingersoll et al. | |
| 8,667,798 B2 | 3/2014 | Hopper et al. | |
| 8,739,540 B2 | 6/2014 | McCutchen et al. | |
| 8,813,488 B2 | 8/2014 | Gibson et al. | |
| 8,833,070 B2 * | 9/2014 | Wilson | F03B 17/02 415/92 |
| 8,869,531 B2 | 10/2014 | Held | |
| 8,978,376 B1 | 3/2015 | Pedziwiatr | |
| 9,587,162 B2 | 3/2017 | Fisk, Jr. | |
| 9,856,850 B1 * | 1/2018 | Sheehan | F03B 17/005 |
| 10,543,737 B2 | 1/2020 | Kujak | |
| 10,683,839 B2 | 6/2020 | Maynard | |
| 10,989,110 B2 | 4/2021 | Maynard | |
| 11,532,949 B2 | 12/2022 | Yogev | |
| 2002/0083708 A1 | 7/2002 | Kono et al. | |
| 2003/0175128 A1 | 9/2003 | Fabry | |
| 2003/0192338 A1 | 10/2003 | Manohar | |
| 2003/0215339 A1 | 11/2003 | Grimmer et al. | |
| 2004/0011038 A1 | 1/2004 | Stinger | |

(56) References Cited

U.S. PATENT DOCUMENTS

| | | |
|---|---|---|
| 2005/0189888 A1 | 9/2005 | Federman |
| 2006/0037337 A1 | 2/2006 | Lear et al. |
| 2006/0236698 A1 | 10/2006 | Langson |
| 2007/0065300 A1 | 3/2007 | Mariani |
| 2007/0189111 A1 | 8/2007 | Garza |
| 2008/0008602 A1 | 1/2008 | Pozivil |
| 2008/0303282 A1 | 12/2008 | Ziegenfuss |
| 2009/0031999 A1 | 2/2009 | Erickson |
| 2009/0127866 A1 | 5/2009 | Cook |
| 2009/0257902 A1 | 10/2009 | Emens |
| 2009/0297368 A1 | 12/2009 | Knox |
| 2010/0032133 A1 | 2/2010 | Lifson |
| 2010/0077788 A1 | 4/2010 | Lewis |
| 2010/0146961 A1 | 6/2010 | Silva |
| 2010/0259044 A1 | 10/2010 | Muchow |
| 2010/0319346 A1 | 12/2010 | Ast |
| 2010/0326100 A1 | 12/2010 | Taras |
| 2011/0049899 A1 | 3/2011 | Hoffman |
| 2011/0120157 A1 | 5/2011 | Wohlert |
| 2011/0201699 A1 | 8/2011 | Lucas |
| 2012/0087810 A1 | 4/2012 | Peussa |
| 2012/0090312 A1 | 4/2012 | Wilson et al. |
| 2012/0100015 A1 | 4/2012 | Kim |
| 2012/0117988 A1 | 5/2012 | Mitra |
| 2012/0174605 A1 | 7/2012 | Huff |
| 2013/0031934 A1 | 2/2013 | Huff |
| 2013/0055756 A1 | 3/2013 | Tsutsumi |
| 2013/0098102 A1 | 4/2013 | Nakayama |
| 2013/0129531 A1 | 5/2013 | Baker |
| 2014/0137582 A1 | 5/2014 | Louvar et al. |
| 2014/0197642 A1 | 7/2014 | Daya |
| 2014/0250879 A1 | 9/2014 | Moncada |
| 2015/0159919 A1 | 6/2015 | Sato |
| 2016/0185473 A1 | 6/2016 | Zucchini |
| 2016/0187893 A1 | 6/2016 | Bergh |
| 2016/0327049 A1 | 11/2016 | Dinsdale |
| 2017/0074268 A1 | 3/2017 | De Kerpel |
| 2017/0248349 A1 | 8/2017 | Kujak et al. |
| 2017/0254223 A1 | 9/2017 | Goethals et al. |
| 2017/0268498 A1 | 9/2017 | Kasahara |
| 2018/0223846 A1 | 8/2018 | Staffend et al. |
| 2019/0063396 A1 | 2/2019 | Maynard |
| 2019/0218968 A1 | 7/2019 | Maynard |
| 2020/0309085 A1 | 10/2020 | Maynard |
| 2021/0180471 A1 | 6/2021 | Wright |
| 2021/0340906 A1 | 11/2021 | Maynard |
| 2022/0316483 A1 | 10/2022 | Maynard |
| 2023/0324084 A1 | 10/2023 | Maynard |

FOREIGN PATENT DOCUMENTS

| | | |
|---|---|---|
| CN | 203629155 U | 6/2014 |
| CN | 107278253 A | 10/2017 |
| CN | 109579337 A | 4/2019 |
| CN | 113310235 A | 8/2021 |
| EP | 1010954 A1 | 6/2000 |
| EP | 2549095 A1 | 1/2013 |
| FR | 2919716 A1 | 2/2009 |
| GB | 2318393 A | 4/1998 |
| JP | H0587299 U | 11/1993 |
| JP | 2002235653 A | 8/2002 |
| JP | 2010-014111 A | 1/2010 |
| KR | 100643343 B1 | 11/2006 |
| WO | 2010125511 A1 | 11/2010 |
| WO | 2012017243 A1 | 2/2012 |
| WO | 2012079171 A1 | 6/2012 |
| WO | 2014110160 A3 | 10/2014 |
| WO | 2017125276 A1 | 7/2017 |

OTHER PUBLICATIONS

Brazilian Office Action for Patent Application No. BR112020003911-0, filed Sep. 13, 2022.

Eurasian Office Action for Eurasian Patent Application No. 202091729, dated Apr. 21, 2021, 3 pages.

European Patent Office, Extended European Search Report for Patent Application No. 22153119.7, dated Jul. 8, 2022, 7 pages.

European Patent Office, Supplementary Search Report for Application No. 18850618.2, dated Dec. 3, 2020, 7 pages.

Examination Report for Indian Patent Application No. 202017032848 dated Mar. 29, 2022, 6 pages.

Indonesian Patent Office, Office Action for Application No. P0020200591 dated Aug. 8, 2022, 5 pages.

International Preliminary Report on Patentability for Application No. PCT//US2018/048413. 10 pages.

International Search Report and Written Opinion for Application No. PCT/US2018/048413 mailed Jan. 4, 2019 15 pages.

International Search Report and Written Opinion for International Patent Application No. PCT/US2019/014039, mailed Apr. 29, 2019, 7 pages.

Intellectual Property Office of the Philippines, Substantive Examination Report for Allowance, for Patent Application No. 1/2020/551095, dated Oct. 18, 2022, 4 pages.

International Search Report and Written Opinion for International Patent Application No. PCT/US2023/017948, mailed Jul. 7, 2023, 8 pages.

Intellectual Property Office of Vietnam, Substantitive Examination for Vietnamese Patent Application No. 1-2020-01781 dated Aug. 18, 2023, with English translation (4 pages).

European Patent Office, Communication Pursuant to Article 94(3) EPC for European Patent Application No. 19740806.5, dated Sep. 22, 2023 (14 pages).

IP Australia, Examination Report No. 1 for Australian Patent Application No. 2018323510, dated Oct. 17, 2023 (5 pages).

Korean Patent Office, Notice of Grounds for Rejection for Korean Patent Application No. 10-2020-7023658, dated Feb. 1, 2024, with English Translation (16 pages).

Canadian Intellectual Property Office, Office Action for Canadian Patent Application No. 3,073,990, dated Jan. 3, 2024 (6 pages).

IP Australia, Examination Report No. 1 for Australian Patent Application No. 2019209876, dated Feb. 22, 2024 (5 pages).

* cited by examiner

GAS-DRIVEN GENERATOR SYSTEM COMPRISING AN ELONGATE GRAVITATIONAL DISTRIBUTION CONDUIT COUPLED WITH A GAS INJECTION SYSTEM

PRIORITY

This patent application claims priority from Provisional U.S. Patent Application No. 63/212,914, filed on Jun. 21, 2021, entitled, "SYSTEMS AND METHODS FOR IMPROVING THE PERFORMANCE OF AN AIR-DRIVEN GENERATOR USING REFRIGERANT," and naming Mark J. Maynard as inventor, the disclosure of which is incorporated herein, in its entirety, by reference.

This patent application is also a continuation-in-part of U.S. patent application Ser. No. 16/861,987, filed on Apr. 29, 2020, and entitled, "AIR-DRIVEN GENERATOR," issued as U.S. Pat. No. 10,968,883, which is a continuation of U.S. patent application Ser. No. 16/115,531, filed Aug. 28, 2018, issued as U.S. Pat. No. 10,683,839, which claims the benefit of, and priority to, U.S. Provisional Patent Application No. 62/550,836, filed on Aug. 28, 2017.

This patent application is also a continuation-in-part of U.S. patent application Ser. No. 17/229,477, filed on Apr. 13, 2021, and entitled "GASEOUS FLUID COMPRESSION WITH ALTERNATING REFRIGERATION AND MECHANICAL COMPRESSION," which is a continuation of U.S. patent application Ser. No. 16/250,736, filed Jan. 17, 2019, issued as U.S. Pat. No. 10,989,110, which claims the benefit of, and priority to, U.S. Provisional Patent Application No. 62/618,720, filed on Jan. 18, 2018.

The seven above noted patent applications are hereby incorporated herein by reference, in their entireties, including their drawings and appendices.

BACKGROUND

For many decades, the need for realizing increased efficiency in gaseous fluid compression has been well recognized. There have been numerous attempts at achieving improved thermodynamic performance and elegance in construction in the provision of systems and methods for compressing gaseous fluids. Knowledgeable scientists and skilled inventors have endeavored to harness the principles of thermodynamics to provide for the compression of gases, such as air, with improved efficiency thereby to enable the conservation of energy and the overall advance of the art.

SUMMARY OF VARIOUS EMBODIMENTS

In accordance with an embodiment of the invention, an gas-driven generator system for generating electric power from movement of a working liquid includes a gas-driven generator system. The gas-driven generator system includes an elongate gravitational distribution conduit with an upper end and a lower end, and plural elongate buoyancy conduits. Each buoyancy conduit has an upper end and a lower end. The upper ends of the elongate buoyancy conduits are in fluidic communication with the upper end of the elongate gravitational distribution conduit. The lower end of the elongate gravitational distribution conduit is in fluidic communication with the lower ends of the elongate plural buoyancy conduits. A closed fluid loop is formed between the elongate plural buoyancy conduits and the elongate gravitational distribution conduit. A working liquid flows from the upper ends of the buoyancy conduits fed into the upper end of the elongate gravitational distribution conduit. Working liquid flows downwardly through the elongate gravitational distribution conduit being fed from the lower end of the elongate gravitational distribution conduit into the lower ends of the plural elongate buoyancy conduits. A liquid turbine system is fluidically interposed between the lower end of the elongate gravitational distribution conduit and the lower ends of the plural elongate buoyancy conduits 1011.

A gas injection system is operative to inject gas into the lower ends each of the plural elongate buoyancy conduits.

A first heat exchanger is in fluidic communication with each of the plural elongate buoyancy conduits. The first heat exchanger includes a first heat exchange fluid. A second heat exchanger is in fluidic communication with an upper chamber and in fluidic communication with a storage tank. The gas-driven generator system may include a third heat exchanger configured to move heat from the gas exiting the upper chamber to the first heat exchanger. The storage tank may be in fluidic communication with the gas injection system.

A thermal heating system is configured to capture thermal energy from an external source. The thermal heating system is in fluidic communication with the first heat exchanger. The thermal heating system may include solar thermal panels configured to capture thermal energy from solar radiation. The thermal heating system may include a fluid loop containing a fluid for moving thermal energy from the solar thermal panels to the first heat exchanger.

An injection of a refrigerant gas into the working liquid disposed in the plural elongate buoyancy conduits will tend to induce upward flow of the working liquid in the plural elongate buoyancy conduits. Working liquid fed to the upper end of the elongate gravitational distribution conduit will have a downward flow within the elongate gravitational distribution conduit to actuate the liquid turbine system.

The gas may be a first refrigerant. The gas injection system may include a third heat exchanger that pressurizes the first refrigerant in liquid form, and evaporates the first refrigerant into a pressurized refrigerant gas prior to being injected into the buoyancy conduits.

The gas-driven generator system may further include a thermal storage system. The thermal storage system may be in thermal communication with the thermal heating system. The thermal storage system may be configured to store thermal energy captured from the gas-driven generator system. The thermal storage system may include a second heat exchange fluid that is a second refrigerant. The first refrigerant and the second refrigerants may be the same material. The first refrigerant and the second refrigerants may be different materials.

In accordance with another embodiment, a gas-driven generator system for generating electric power from movement of a working liquid includes a gas-driven generator system. The gas-driven generator, includes an elongate gravitational distribution conduit with an upper end and a lower end, and plural elongate buoyancy conduits. Each buoyancy conduit has upper end and a lower end.

The upper ends of the elongate buoyancy conduits are in fluidic communication with the upper end of the elongate gravitational distribution conduit, and the lower end of the elongate gravitational distribution conduit is in fluidic communication with the lower ends of the elongate plural buoyancy conduits. A closed fluid loop is formed between the elongate plural buoyancy conduits and the elongate gravitational distribution conduit. Working liquid flows from the upper ends of the buoyancy conduits into the upper end of the elongate gravitational distribution conduit. Working liquid flows downwardly through the elongate gravitational distribution conduit. The working liquid is fed from the lower end of the elongate gravitational distribution conduit into the lower ends of the plural elongate buoyancy conduits.

The gas-driven generator system includes a liquid turbine system fluidically interposed between the lower end of the elongate gravitational distribution conduit and the lower ends of the plural elongate buoyancy conduits.

The gas-driven generator system includes a first fluid thermal transfer including a first heat exchanger in fluidic communication with each of the plural elongate buoyancy conduits. The first heat exchanger includes a first heat exchange fluid. A portion of working fluid in the plural elongate buoyancy conduits is removed from at least one of the plural elongate buoyancy conduits. The portion of working fluid circulates through the first fluid thermal transfer circuit. The portion of working fluid is returned to the plural elongate buoyancy conduits.

The gas-driven generator system includes a second fluid thermal transfer circuit including a second heat exchanger in fluidic communication with an upper chamber and in fluidic communication with a storage tank.

The gas-driven generator system includes a gas injection system in fluidic communication with each of the plural elongate buoyancy conduits and in fluidic communication with the second heat exchanger. The gas injection system is operative to inject gas into each of the plural elongate buoyancy conduits. The gas injection system is configured to receive refrigerant gas from the second heat exchanger, transfer heat to the refrigerant gas, and inject the vaporized refrigerant gas to each of the plural elongate buoyancy conduits.

The gas-driven generator system includes a solar thermal heating system fluidically coupled to the first heat exchanger configured to transfer heat collected by the solar thermal heating system to the first heat exchanger.

An injection of compressed gas into the working liquid disposed in the plural elongate buoyancy conduits will tend to induce upward flow of the working liquid in the plural elongate buoyancy conduits. Working liquid fed to the upper end of the elongate gravitational distribution conduit will have a downward flow within the elongate gravitational distribution conduit to actuate the liquid turbine system. The circulation of the portion of working fluid through the thermal transfer circuit will tend to increase the temperature of the working fluid in plural elongate buoyancy conduits. The compressed gas may be a first refrigerant.

The gas-driven generator system may include a thermal storage system in thermal communication with the thermal heating system. The thermal storage system may be configured to store thermal energy generated by the gas-driven generator system. The thermal storage system comprises a thermal storage medium.

The gas-driven generator system may further include a third heat exchanger in thermal communication with the thermal storage medium. The third heat exchanger may be in fluidic communication with the first heat exchanger and in fluidic communication with solar heating system. The third heat exchanger may be configured to transfer heat to the thermal storage medium from the first heat exchanger.

The gas-driven generator system may further include a first heat pump in fluidic communication with the condenser. The condenser may be in thermal communication with thermal storage medium. The first heat pump may be in fluidic communication with a radiator. The heat may be transferred from the condenser to the radiator. The first heat pump may further include a refrigerant compressor in fluidic communication with the condenser and the radiator. A heat exchange fluid may be transferred from the condenser to the radiator by the compressor. The heat exchange fluid may be a second refrigerant.

The gas-driven generator system may further include a fresh water collection system configured to isolate fresh water from salt water. The fresh water collection system may further include a container for the salt water in thermal communication with the thermal storage medium. The fresh water collection system may further include a condensing surface configured to condense water vapors to form liquid water. The fresh water collection system may further include a collection vessel that receives the condensed liquid water. The condensing surface may be configured to direct the liquid water to the collection vessel.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Gas-Driven Generator Systems

Figure 1A:
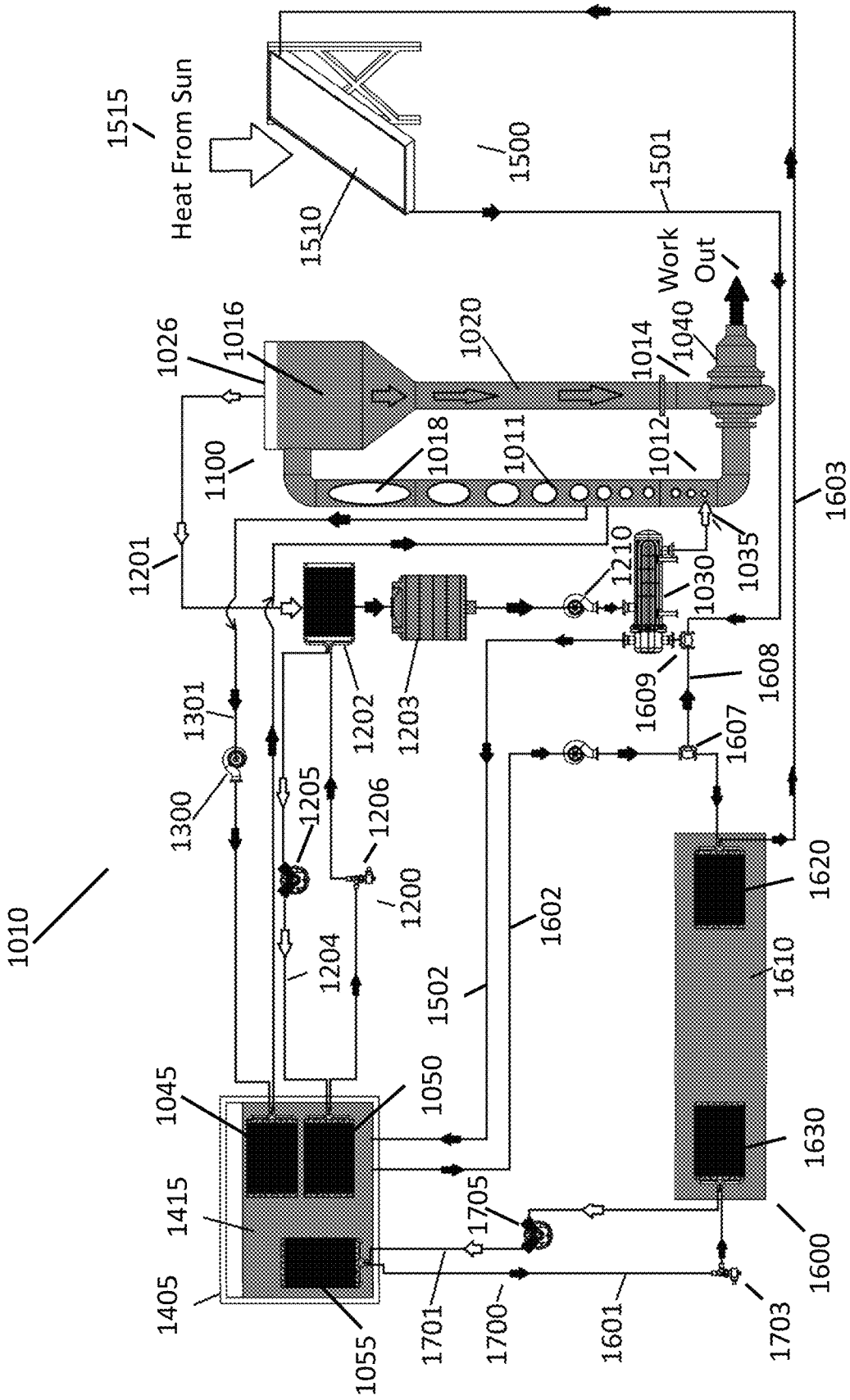
FIG. 1A schematically shows an embodiment of a gas-driven generator system in accordance with illustrative embodiments.

At a basic level, the gas-driven generator described in U.S. application Ser. No. 16/861,987 has two types of liquid columns connected by a turbine. There is a heavy working liquid in these columns (e.g., 2.6 times heavier than water). The columns of liquid are in conduits. This working liquid can also have non-Newtonian properties. In one column, the buoyancy conduit, pressurized gas is introduced into the bottom of the column by a gas injection system in similar fashion to how air is introduced by an air compression system such as described in U.S. application Ser. No. 16/250,736. In operation, the pressurized gas displaces some of the working liquid in this buoyancy column and the displaced liquid lowers the weight of the buoyancy column relative to the full gravitational column thereby creating a force between the two columns that is equal to the weight of the displaced fluid. Because the two columns are connected through a turbine, the liquid flows from the heavy column to the light column as motive flow. The displacement of the working liquid in the buoyancy column is the effective head pressure of the fluid—that is, the level difference between the two columns, which induces movement from the gravitation column into the buoyancy column via the turbine. Electricity is generated as the working liquid moves through the turbine. The design of the tower is such that the displaced fluid from the top of the buoyancy column flows into the top of the gravitational column, thereby maintaining a near constant level in the gravitation column. The steady introduction of gas creates a steady-state displacement of fluid and a steady state motive flow. In embodiments, the gas may be a gaseous refrigerant (e.g., refrigerant gas) or other substance with favorable properties.

The inputs to this system are the compressed gas and heat captured from the compression system and moved into the working liquid via heat exchangers. The gas, as it depressurizes and expands in the working liquid, absorbs heat from the working liquid. Refrigerant gas (e.g., displacement gas) and heat are constantly added to the working liquid, and the added heat can maintain the working liquid in thermal equilibrium because, in a steady-state operation, the amount of heat absorbed by the refrigerant gas during its expansion can be exactly equal to the heat added to the working liquid at a steady state temperature.

The refrigerant gas may be injected into the buoyancy conduits by a gas injection system that is configured to receive a liquid refrigerant from a heat exchanger (i.e. condenser) via a storage tank and a pump which pressurizes the liquid refrigerant to the necessary pressure for injection. The gas injection system may then include a heat exchanger (i.e. evaporator) to vaporize the pressurized liquid refrigerant. The gas injection system will then inject the pressurized gaseous refrigerant into the elongate buoyancy conduits.

The expansion of the gas in the working liquid does work on the working liquid that, in total, sustains a volumetric displacement of the working liquid in the buoyancy column. This displacement lowers the overall density of the buoyancy column relative to the gravitation column, resulting in an induced flow of working liquid from the gravitational column into the buoyancy column. This movement is sustained by the working liquid being returned to the gravitation column in the upper chamber. The work done by the refrigerant gas depressurizing and expanding in the buoyancy column is equal to the work necessary to cause the effective displacement of the working liquid between the two columns. This work corresponds to the maximum work able to be extracted by a turbine between the columns. The percentage displacement of the working liquid by the gas in the buoyancy column is the effective head pressure of the fluid. Because the two columns are connected through a turbine the fluid flows from the heavy column to the light column as motive flow. As this motive flow passes through the turbine electricity is generated. The steady introduction of gas creates a steady-state displacement of fluid and a steady state motive flow.

This system, like the air-driven generators described in U.S. application Ser. No. 16/861,987 are thereby able to efficiently utilize the low-grade heat added via a heat exchanger to drive the expansion work of the gas and convert this work into electrical power via the turbine. Captured heat from the thermal heat source can be transferred to the working liquid coincident with the injection of pressurized gas, thereby allowing the added heat to maintain a thermal equilibrium in the working liquid while the expansion of the gas absorbs heat from the surrounding working liquid. This operation allows addition of the low-grade heat to support the expansion of the refrigerant gas and thereby sustain the weight difference between the two columns, which, in turn, sustains the power output of the turbine. As discussed herein, additional low grade heat added to the working liquid can provide for additional expansion of the refrigerant gas and increase the output from the turbine as the weight different between the two columns increases with additional expansion of the gas in the buoyancy column.

Improving Gas-Driven Generator Performance by Addition of Low Grade Heat

As discussed herein, additional low grade heat added to the working liquid can provide for additional expansion of the refrigerant gas and increase the output from the turbine as the weight difference between the two columns increases with additional expansion of the refrigerant gas in the buoyancy column. One such source of this low-grade heat is from solar thermal energy, which has, in more traditional power systems, needed to be collected and concentrated in order to produce high grade heat. Aspects of the present disclosure capture low grade thermal solar energy and transfer this heat to the working liquid of a gas-driven generator in order to increase the power output of the turbine or reduce the mass flow of refrigerant necessary to produce a given power output target.

Examples of the present disclosure include systems and methods for taking advantage of how the addition of low-grade heat can increase the power output of gas-driven generator systems, such as those described in U.S. application Ser. No. 16/861,987, or maintain a power output and significantly lower the amount of refrigerant needed to drive the tower and, accordingly, lower the power needed to operate the system.

Examples of the present disclosure include systems and methods for capturing and adding additional heat into the working liquid (e.g., via the heat exchangers). By adding additional heat to working liquid, the working liquid can be heated to higher temperatures and enable more expansion of the gas in the working liquid.

Examples of the present disclosure enable the use of thermal solar panels that collect heat at very little energy cost and use the captured thermal energy to elevate the liquid temperature higher in the tower. This can be done, for example, by adding the heat to the working liquid via a heat exchanger by running a fluid loop between the heat exchanger and a solar thermal system and/or a thermal storage system heated by a solar thermal system. The resultant higher working liquid temperature, which leads to more expansion of the gas expanding in the buoyancy conduit, increases the weight difference across the turbine, which, in turn, increases the net power output and/or lowers the amount of refrigerant needed to operate the overall system. This will increase the ratio of output power compared to input power.

Generally, aspects of the present disclosure enable the conversion of low-grade heat into electrical power by adding the low-grade heat to the working liquid of an gas-driven generator via the heat exchanger, as discussed above. As discussed herein, solar thermal panels are one source of low-grade heat, but one skilled in the art will appreciate that a multitude of other sources are possible, including as waste heat from several common industrial processes (e.g., condenser heat from HVAC units).

On average a solar panel will collect 442 BTUs per square foot per hr. Using a panel of 40 square feet, that equals 17,600 BTUs per panel per hour or 294 BTUs per minute per panel. Approximately 8000 panels would fit on eight acres of land which means 2,357,328 BTUs per minute can be put into the system. If a little more than half of the energy was put into low grade storage (approximately 190° F.) for night time and cloudy day operation, then 942,931 BTUs per min would still be available for flash boiling of the refrigerant and for assisting the expansion of the gas to increase the power output of the plant.

That is, due to the closed loop nature of some embodiments of the gas driven generator, the gas driven generator may include a gas recapture system. When appropriate, this gas recapture system may be a heat exchanger or condenser, causing the escaping gases to cool off and/or condense. In embodiments the heat from the gas in this heat exchanger/condenser may also be recaptured, sometimes with the use of a heat pump and sometimes without. In other embodiments, the heat from the gas in this heat exchanger/condenser will be rejected into a convenient heat sink.

Improving Air-Driven Generator Performance Using Phase Change Refrigerants

Examples of the present disclosure include air-driven generators that use a refrigerant in place of air as the fluid injected into and expanding in the working liquid. That is, refrigerant goes through a phase change from a liquid to a gas when it is entering the working liquid, and is condensed from a gas back to a liquid when it is removed from the tower. In the present examples, the air is completely removed from the operation and replaced with a refrigerant that has a flash boiling temperature low enough for a solar thermal heating system to be used to add heat to the refrigerant, but with a vapor pressure high enough to accomplish the necessary displacement of the working liquid in the tower as the gaseous refrigerant expands in the working liquid and absorbs heat from the working liquid. Since, in this disclosure, there are several heat pumps disclosed, the refrigerant used as the displacement gas for the gas-powered generator will be identified as the first refrigerant.

In these examples, the generator may be referred to as a gas-driven generator. Typically, the motive force of the working liquid is generated by the vaporization and expansion of the first pressurized refrigerant gas. A careful selection of the first refrigerant is important because, if the temperature is right, the reclamation of the heat not used in the conversion of mechanical force into electricity by the generator can be recovered, as well as 100% of the refrigerant, in a recovery system. Therefore, the refrigerant to be used as the gas in the gas-driven generator should have certain properties that would be desirable for this application. Desirable properties for the refrigerants include a high vapor pressure, a low latent heat, and having a phase change within the range of the operating temperatures. Non-exclusive examples of refrigerants for the gas-driven generator systems include pentane (C5H12) and isopentane (C5H12). Pentane has a boiling point of 96.98° F. (36.1° C.), and isopentane has a boiling point of 82.04° F. (27.8° C.). Additional potential refrigerants include other hydrocarbons, as well as fluorinated hydrocarbons. One other example material that may serve as a first refrigerant is Refrigerant C318. Refrigerant C318 (Octafluorocyclobutane, R C318, Freon C318, perfluorocyclobutane, MackFri-318C, Halocarbon-C318, RC318, FC C318) is a colorless gas without odor, and can be liquefied under pressure. It has a boiling point of −5.8° C. (21.6° F.).

The term gas-driven generator does not exclude a generator that is driven by air. Indeed, a gas-driven generator may include any gas that has favorable properties considering the operating temperatures and pressures of the generator.

Examples of the present disclosure include solar thermal panels large enough to completely support the phase change operation of the refrigerant. Typical thermal solar systems require only enough electrical energy to power circulating pumps to collect a large amount of heat from the solar thermal panels. Therefore, with very little additional energy cost, a solar thermal system can provide sufficient thermal energy to elevate the temperature of the liquid refrigerant high enough to support flash boiling of the liquid refrigerant allowing it to be gaseous in the working liquid in the buoyancy conduit.

Examples of the present refrigerant-driven generator systems can be perfectly suited for operation within 30 degrees latitude of the equator, where the sun light is more or less 12 hours per day. This would minimize the storage needed for the system to operate during rain events and over nights.

Other examples of the present disclosure can include the option of adding a fresh water generating system (e.g., de-salination system) to the gas-driven generator system. Examples of a de-salination system that could be powered by excess heat transferred from the gas-generated system include a system that evaporates salt water, and condenses and collects fresh water. Optionally, the gas-driven generator system may use the solar heat to evaporate salt water into fresh water first, then capture both the water and the heat using a heat pump to send the heat to a heat exchanger that can inject the heat to the buoyancy conduit for assisting the expansion of the refrigerant. In embodiments, a massive concrete base for heat storage, or other suitable thermal storage (e.g., including a phase change material), may be in thermal communication with a water evaporation tank. The excess heat collected from the de-salination system may be transferred to a large heat sink for thermal storage. The heat stored in the heat sink may be used to power the de-salination system, it may be transferred to a heat exchanger for being sent to the buoyancy conduit, or both. In these examples, both fresh water and electric power are generated.

Additionally, examples include gas-driven generator systems that can operate using air and a refrigerant and can switch between air and refrigerant being injected into the working liquid as necessary due to operating conditions and the environment. These examples, using larger solar thermal field systems, can be operated in latitudes farther from the equator and switch over to the much more efficient refrigerant system when conditions are right. Examples include a dual-use heat reclamation system that captures heat from the gas freed from the working liquid in the upper chamber before being exhausted, and also operates as a refrigerant recovery system to reclaim refrigerant that may be mixed with the air during a switch over from air to refrigerant, or from switching from a refrigerant to air.

FIG. 1A schematically illustrates various embodiments of the present disclosure as a gas-driven generator system 1010 in accordance with illustrative embodiments. The gas-driven generator system 1010 of FIG. 1A includes a gas-driven generator 1100 that includes a buoyancy conduit 1011, a gravitational distribution conduit 1020, a fluid (e.g., refrigerant) injection system 1030, and a turbine 1040 positioned between and fluidly coupling a lower end of the gravitational distribution conduit 1014 with a lower end of the buoyancy conduit 1012. A heavy working liquid 1016 is circulated through the gas-driven generator system 1010 of FIG. 1A. The movement of the working liquid 1016 from the gravitation column 1020 into the buoyancy column 1011 via the turbine 1040 generates electricity. That is, electrical output from the gas-driven generator system 1010 is generated as the working liquid 1016 moves through the turbine 1040. The production of electricity in the turbine represents work being performed by the gas-driven generator system 1010, as indicated by the arrow marked "Work Out" 1041.

The fluid injection system 1030 injects a first refrigerant through first line 1035 into the lower end of the buoyancy conduit 1012. In embodiments, the fluid injection system 1030 is a heat exchanger that evaporates the refrigerant into a pressurized gas. In embodiments, the fluid injection system 1030 is a tube and shell heat exchanger. In embodiments, the first refrigerant is injected into the working liquid 1016 as a liquid at high pressure and is flash evaporated to form a pressurized displacement gas 1018 (e.g., the gas phase of the refrigerant) which displaces some of the working liquid 1016 in the buoyancy conduit 1011. In embodiments, the first refrigerant is injected into the working liquid 1016 as a pressurized gas 1018 which displaces the working liquid 1016 in the buoyancy conduit. In either embodiment, the displaced working liquid 1016 lowers the weight of the buoyancy column relative to the full gravitational column. The weight difference between the two columns creates a force between the two columns that is equal to the weight of the displaced fluid, resulting in the force that turns the turbine 1040.

A portion of the working liquid 1016 is circulated through a heat exchange circuit 1301, where the working liquid gains heat from a first heat exchanger 1405. The gas-driven generator system 1010 has a first heat exchanger 1405 that is fluidically connected by first fluid circuit 1301 to the buoyancy conduit 1011 for receiving working liquid 1016 from the buoyancy conduit 1011. The first heat exchanger 1405 includes a bath of a first heat exchange fluid (e.g., exchange fluid). The first heat exchanger 1405 is configured to add thermal heat to the working liquid 1016 passing from the fluid turbine 1040 into the buoyancy conduit 1011. The working liquid 1016 is impelled into the first radiator 1045 by a first pump 1300 that is in fluidic communication with buoyancy conduit 1011. The working liquid 1016 flows through first radiator 1045 and is heated by thermal exchange in a bath formed of the first heat exchange fluid 1415.

The first heat exchange fluid 1415 in the first heat exchanger 1405 is itself heated by three different heat sources: (1) a refrigerant reclamation system that has heat as a byproduct 1200; (2) a heat storage system 1600; and (3) a solar thermal heating system 1500.

The refrigerant heat reclamation system reclaims some of the heat developed in the gas-driven generator system 1010 before it is lost to the surroundings. A portion of the heat that is absorbed in the pressurized expansion gas 1018 as it rises and expands in the heat of the buoyancy conduit 1011 may be reclaimed by transferring its heat along line 1204 in a first heat pump cycle 1200. In the gas-driven generator system 1010, the first refrigerant 1018 gas is expelled from the upper chamber 1026. It is then circulated through a heat exchanger 1202, which acts as a condenser for the first refrigerant 1018, while simultaneously acting as an evaporator for the refrigerant in heat pump cycle 1200. In the heat exchanger 1202, all of the first refrigerant 1018's latent heat is removed and transferred via the heat pump cycle 1200 into the first heat exchanger fluid 1415 via refrigerant cycle condenser 1050.

The latent heat removed from the expansion gas 1018 at the condenser 1202 is moved by a second refrigerant transporting the heat to the first heat exchanger 1405 along second fluid circuit 1204. The circuit designated second fluid circuit 1204 is a heat pump cycle 1200. The heat pump cycle 1200 includes a first refrigerant compressor 1205, second radiator 1050 (submerged in the first exchange fluid 1415 in first heat exchanger 1405), first throttle valve 1206, and first evaporator 1202. The heat transported by the second refrigerant is transferred to the first exchange fluid 1415 in first heat exchanger 1405 by circulating through second radiator 1050.

Returning to the refrigerant reclamation system, following condensation of the first refrigerant gas 1018 into a liquid at the first condenser 1202, the liquid refrigerant is conveyed to storage tank 1203. Then, the liquid first refrigerant is compressed and pumped by pump 1210 to the fluid injection system 1030. Fluid injection system 1030 is a heat exchanger that evaporates the liquid first refrigerant into a compressed gas for injection into the buoyancy conduit 1011 to complete the first refrigerant 1018's cycle.

The gas-driven generator system 1010 further includes a solar thermal heating system 1500 that adds heat to the gas-driven generator system 1010. The solar thermal heating system 1500 is ultimately fluidically coupled to a first heat exchanger 1405. The solar thermal heating system 1500 includes a plurality of solar thermal panels 1510 configured to absorb solar radiation 1515, and a fluid loop 1501 that conveys the thermal energy (heat) to the fluid injection system 1030 via the first exchange fluid 1415. The fluid injection system 1030 takes advantage of the highest temperature heat transfer fluid 1415 that is returning from solar heating system 1500 and uses that heat to flash boil the pressurized liquid refrigerant 1018.

All of the lines 1602, 1608, 1603, 1501, and 1502 contain first heat transfer fluid that is either being heated or heating something else. During the day when the solar system 1500 is absorbing solar radiation, the first heat transfer liquid 1415 moves through lines 1602, 1603, 1501, and 1502 in that order to transfer heat from the first heat exchanger into storage and replenish it using the solar thermal heating system 1500. At night, heat pump circuit 1700 heats the first bath from the storage, and the three way valves 1607 and 1609 are flipped such that heat transfer fluid 1415 moves from fluid line 1602 to fluid line 1608 then to fluid line 1502, which allows heat transfer fluid 1415 to flash boil the liquid refrigerant in fluid injection system 1030.

The gas-driven generator system 1010 further includes a thermal storage system 1600 for the storage and retrieval of thermal energy. The thermal storage system includes a thermal storage medium 1610 that has a large heat capacity with heat exchange components 1620, 1630 through which a heat exchange fluid may flow. In embodiments, the thermal storage medium may be inContact with a phase change material. Heat (e.g., thermal energy) can be transferred into the thermal storage medium 1610, and it can be transferred out of the thermal storage medium 1610. The thermal storage medium 1610 may also be heated directly by solar radiation. Therefore, the thermal storage medium 1610 may be heated directly by solar radiation, by heat transfer from the solar thermal heating system 1500, and by heat transfer from other components of the gas-driven generator system 1010. Furthermore, heat may be transferred from the thermal storage system 1600 to the first heat exchanger 1405 for transfer to working liquid 1016.

Alternately, the first exchange fluid 1415 being conveyed from first heat exchanger 1405 through fluid line 1602 may bypass the thermal storage system 1600 to be directed to fluid injection system 1030. To bypass the thermal storage system 1600, valve 1607 is configured to direct the first exchange fluid 1415 along a storage bypass line 1608 toward the fluid injection system 1030 rather than the thermal storage medium 1610.

As shown in FIG. 1A, the thermal storage system 1600 includes a thermal storage medium 1610 that is a thermal storage material. Though not shown here, in embodiments, the thermal storage medium may be inContact with a phase change material. The thermal storage material may include at least one of natural stone, a formed concrete block, a brick structure, or the like. The thermal storage medium 1610 may be heated by direct solar radiation (e.g., heat from the sun) on surfaces of the thermal storage material. Heat may also be transferred to the thermal storage medium 1610 by conveying the first exchange fluid 1415 from first heat exchanger 1405 through fluid line 1602 to circulate through heat exchanger 1620. Once the first exchange fluid 1415 has circulated through heat exchanger 1620, it is conveyed along line 1603 to the solar thermal system 1500 where it will be recirculated through the solar thermal panels 1510, thereby being reheated by the solar radiation 1515 for collection from the for return to heat exchanger 1405.

The heat stored in thermal storage medium 1610 may be transferred to the first heat exchanger 1405 by second heat pump cycle 1700, which regulates a portion of the flow of heat between the thermal storage medium 1610 and the first heat exchanger 1405. Heat can be transferred from the thermal storage medium 1610 to the first heat exchanger 1405 through fluid line 1701 by second refrigerant compressor 1705. The heat pump cycle 1700 utilizes a third refrigerant. In embodiments, the third refrigerant may be the same as the second refrigerant, and in embodiments the third refrigerant my be different than the second refrigerant. The selection of the third refrigerant, as well as the first and second refrigerants, is based on the operating temperature of the gas-driven generator system 1010 and the various components which make up the system. The ambient temperature of the surrounding environment also is a factor in the selection of the first refrigerant, the second refrigerant, and the third refrigerant.

The third refrigerant is conveyed to radiator 1055 where thermal heat is transferred to the first exchange fluid 1415 in first heat exchanger 1405. Then, the third refrigerant is conveyed along line 1601 to second throttle valve 1703 where it is depressurized and conveyed to evaporator 1630, where the refrigerant is evaporated into a gas before being conveyed to the second refrigerant compressor 1705.

Figure 1B:
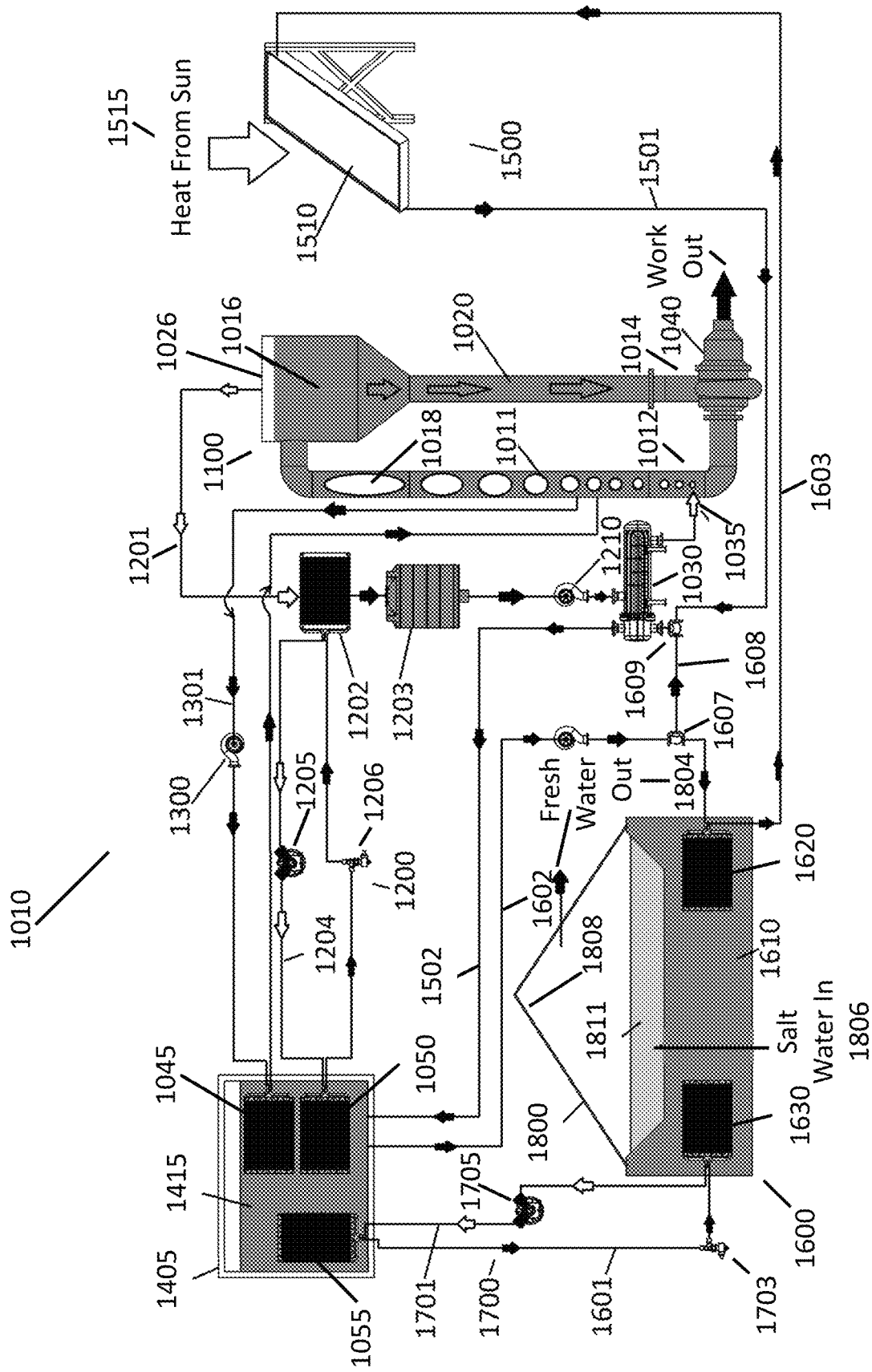
FIG. 1B schematically shows an embodiment of a gas-driven generator system in accordance with illustrative embodiments.

In embodiments, the thermal storage system 1600 may be combined with an apparatus for the collection of fresh water from salt water, as shown in FIG. 1B. By combining a fresh water collection system with a thermal storage system, it is possible to utilize the heat stored in the thermal storage medium for an additional purpose in addition to, or optionally in exchange for, exclusively adding heat the first exchange fluid 1415 in the first heat exchanger 1405.

As shown in FIG. 1B, fresh water collection system (e.g. de-salination system) 1800 may be integrated with thermal storage system 1600 as a part of the gas-driven generator system 1010. FIG. 1B illustrates every feature in FIG. 1B, and also includes the fresh water collection system 1800. Therefore, a detailed description of the components of the gas-driven generator system 1010 that are present in FIG. 1A will be foregone, and the following disclosure will be directed to various embodiments of the fresh water collection system 1800.

The fresh water collection system 1800 is thermally connected to thermal storage medium 1610. A pool of salt water 1811 may be provided in thermal communication with the thermal storage medium 1610. In embodiments, the pool of salt water 1811 may be contained in a recess formed in an upper surface of the thermal storage medium, or may be contained in a separate container that is in thermal communication with the thermal the storage medium 1610. Salt water is provided to the pool of salt water via a source through a conduit 1806.

The heat present in the thermal storage medium 1610 causes the water to evaporate from the pool of salt water 1811 and condense on a condensing surface 1808. The water condensed on condensing surface 1818 is collected as fresh water out 1804. In this way, the fresh water collection system 1800 can use the heat stored in thermal storage medium 1610 to isolate fresh water (e.g., fresh water out 1804) from a source of salt water (e.g., salt water in 1806).

Figure 2:
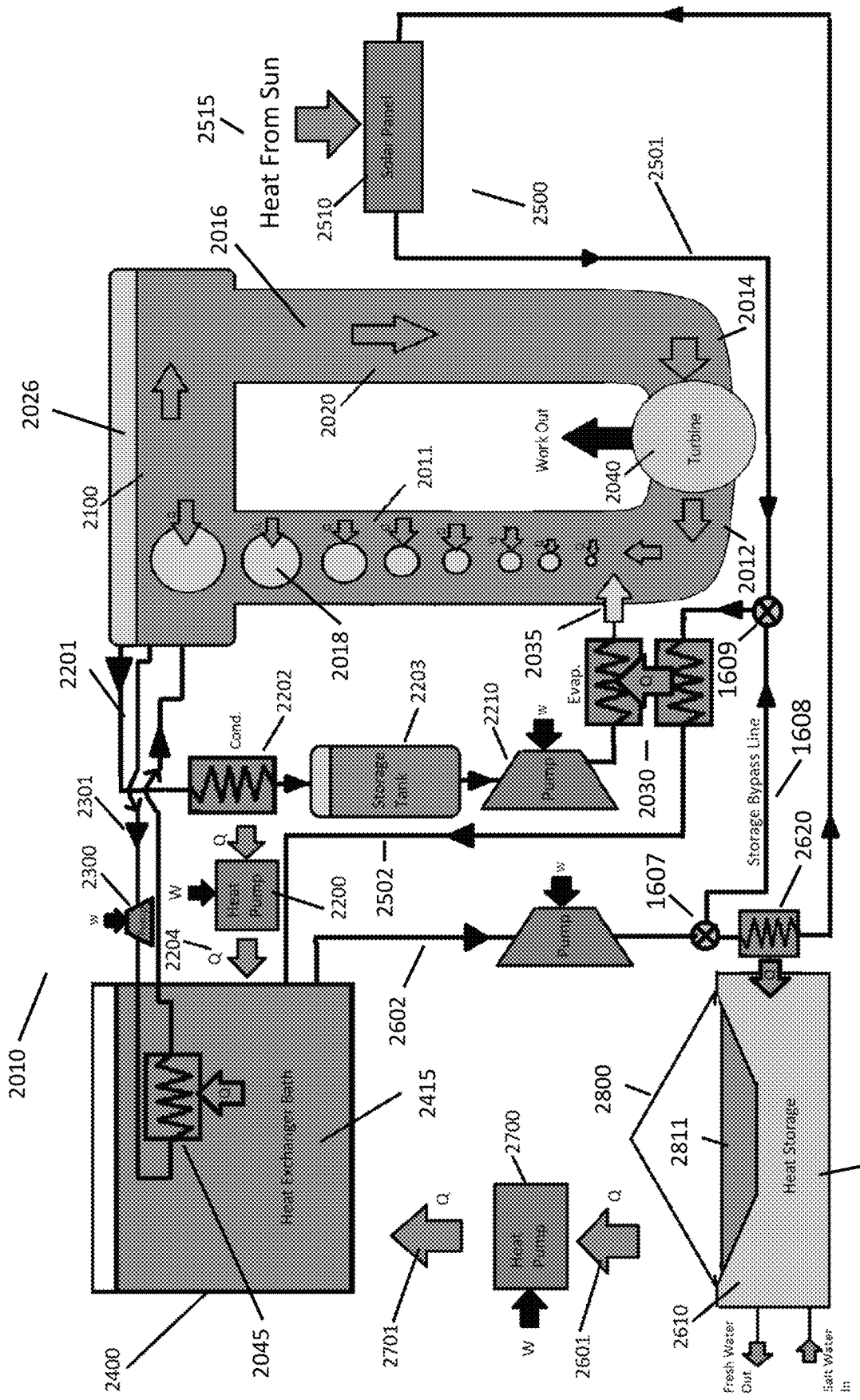
FIG. 2 schematically illustrates various embodiments of the present disclosure as a gas-driven generator system in accordance with illustrative embodiments.

FIG. 2 schematically illustrates various embodiments of the present disclosure as an gas-driven generator system 2010 in accordance with illustrative embodiments. In FIG. 2, many of the components of the gas-driven generator system 1010 are presented as thermodynamic components to describe energy flows through the system. Therefore, some physical components such as fluid lines or gas lines are omitted from the FIG. 2 schematic to simplify the discussion of energy flows.

The gas-driven generator system 2010 of FIG. 2 includes a gas-driven generator 2100 that includes a buoyancy conduit 2011, a gravitational distribution conduit 2020, a fluid injection system 2030, and a turbine 2040 positioned between and fluidly coupling a lower end 2014 of the gravitational distribution conduit 2020 with a lower end 2012 of the buoyancy conduit 2011. A heavy working liquid 2016 is circulated through the gas-driven generator system 2010 of FIG. 2 in the direction indicated by the arrows.

The circulating working liquid 2016 turns the turbine 2040 and performs work that produces electrical energy, as represented by the large arrow coming out of the turbine with the words "Work Out." The amount of energy (e.g., electrical power) produced by the turbine is proportional to the head difference of the gravitational conduit 2020 and the buoyancy conduit 2011, the weight (e.g., density) of the working liquid 2016, and the downward velocity of the working liquid 2016.

While the actual density of the working liquid is determined by its composition, the "effective" density of the working liquid 2016 in the buoyancy conduit 2011 is determined by taking a weighted average of the densities of working liquid 2016 and the expanding pressurized gas 2018, where the weighting fractions are the fraction of the volume each substance takes inside the buoyancy conduit 2011. The presence of the pressurized gas 2018 in the buoyancy conduit 2011 displaces an equivalent volume of the heavy working liquid 2016. That is, the weight difference between the two columns is caused by the presence of the expanding pressurized gas 2018 in the buoyancy conduit 2011. This creates a force between the two columns that is equal to the weight of the displaced working liquid 2016. Therefore, the power produced by the gas-driven generator is increased by increasing the volume flow rate of the pressurized gas 2018, and/or increasing the specific volume of the pressurized gas 2018 during expansion in the buoyancy column 2011 by adding heat to the system.

Energy in the form of electrical power and low grade thermal heat is transferred to the gas-driven generator system. Electrical power is provided to pumps and compressors to compress and circulate fluids. Low grade thermal power is captured from gas that is exiting the upper chamber of system and from solar thermal panels. The thermal power is transferred to the system via thermal exchange in heat exchangers, where the working liquid is circulated through radiators that are in a thermal transfer liquid. Finally, the low grade thermal power stored in the thermal bath is transferred to the working liquid in the buoyancy conduits by circulating the working liquid through the radiators in the thermal baths.

Referring to both FIG. 1A and FIG. 2, the fluid injection system 2030 injects pressurized gas 2018 (e.g., through the gas line 2035) into the lower end of the buoyancy conduit 2012. The pressurized gas 2018 displaces some of the working liquid 2016 in the buoyancy conduit 2012, and the displacement of working liquid 2016 lowers the total weight of the working liquid 2016 in the buoyancy column 2011 relative to the full weight of the working liquid 2016 in the gravitational column 2020. The compressed gas 2018 bubbles are shown as growing as they rise in the buoyancy conduit 2012. The growing bubbles of compressed gas 2018 illustrate that the air is undergoing a polytropic expansion, meaning that heat addition is simultaneous with expansion. That is, the pressurized gas 2018 is receiving heat from the working liquid 2016 as it depressurizes and expands and moves towards the top of buoyancy conduit 2011. That is, while receiving heat from the working liquid 2016 causes the pressurized gas 2018 to expand, the pressurized gas 2018 also expands due to the static pressure being lower as the pressurized gas 2018 approaches the surface of the working liquid 2016. This is illustrated by the arrows with a "Q" pointing at the air bubbles, indicating that heat (e.g., energy) is being transferred from the working liquid 2016 to the expanding compressed air 2018. A portion of the heat stored in the compressed gas 2018 is reclaimed in the refrigerant heat reclamation system. Refrigerant gas 2018 is expelled from gas-driven generator 2100 from upper chamber 2026 through line 2201 and is circulated through a first condenser 2202 (e.g., heat exchanger) where its latent heat is removed, and the refrigerant gas 2018 is condensed to the liquid phase of the first refrigerant. The condensed first refrigerant is conveyed to storage tank 2203. The first refrigerant is compressed and pumped into evaporator 2030 (e.g., fluid injection system 2030) by pump 2210. Work is being performed on the condensed first refrigerant by pump 2210, as evidenced by the arrow marked "W".

The injection system 2030 is shown as exchanging heat from line 2501, as evidenced by the arrow marked with a "Q" coming from the solar thermal heating system 2500. This thermal energy is being transferred to the refrigerant gas in evaporator 2030 prior to being injected into the buoyancy conduit 2011. In the evaporator, the compressed first refrigerant is evaporated, and then injected into the gas-driven generator 2100 by fluid injection system 2030.

In another heat pump cycle, the thermal energy (e.g., heat) transferred from heat exchanger 2202 is transferred by heat pump 2200 (e.g., heat pump cycle 1200) to the first exchange fluid 1415 (e.g., heat exchanger bath) in the first heat exchanger 2400.

Additional heat is transferred to the first exchange fluid 1415 (e.g., heat exchanger bath) in the first heat exchanger 2405 from the solar thermal heating system 2500 along line 2501 and 2502 after passing through the fluid injection system 2030.

Heat stored in the first exchange fluid 1415 (e.g., heat exchanger bath) is transferred into the gas-driven generator 2100 by circulating a portion of working liquid 2016 through fluid circuit 2301. Working liquid 2016 is pumped by pump 2300 into radiator 2045, and heat stored in the heat exchanger bath is transferred to the working liquid 2016 while it is being circulated through fluid circuit 2301.

Thermal storage system 2600 can store thermal energy directly from the sun (e.g., solar radiation), and other heat sources in gas driven generator system 2010. FIG. 2 shows an embodiment of the thermal storage system 2600 that includes an optional fresh water collection system 2800.

Thermal energy may be stored in the thermal storage medium 2611 of the thermal storage system 2600 by pumping first heat exchange fluid 2415 through line 2602 to radiator 2620 located at the heat storage medium 2611. The thermal transfer is indicated by the arrow with a "Q" signifying thermal transfer from the heat exchange fluid 2415 through the radiator 2620 to the heat storage medium 2611.

Thermal energy may also be transferred from the thermal storage medium 2611 to the first heat exchange fluid 2415 by heat pump 2700 (e.g., second heat pump cycle 1700). Work in the form of electrical energy is put into heat pump 2700, as indicated by the arrow with a "W" pointing toward the heat pump 2700. Heat is moving from the thermal storage system 2600 toward the heat pump, as indicated by the arrow 2601 with a "Q" pointing toward the heat pump 2700. Furthermore, heat is moving from the heat pump 2700 toward the first heat exchange fluid 2415, as indicated by the arrow 2701 with a "Q" pointing toward the heat pump 2700.

The optional water collection system 2800 utilizes heat stored in the heat storage medium 2611 to evaporate water from a salt water pool 2811 so that fresh water can be condensed and collected.

The refrigerants in heat pumps 1700 and 1200 may be the same material, or they may be a different material.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A gas-driven generator system for generating electric power from movement of a working liquid, the gas-driven generator system comprising:
    an elongate gravitational distribution conduit with an upper end and a lower end;
    plural elongate buoyancy conduits, each buoyancy conduit with an upper end and a lower end;
    wherein:
    the upper ends of the elongate buoyancy conduits are in fluidic communication with the upper end of the elongate gravitational distribution conduit; and
    the lower end of the elongate gravitational distribution conduit is in fluidic communication with the lower ends of the elongate plural buoyancy conduits such that a closed fluid loop is formed between the elongate plural buoyancy conduits and the elongate gravitational distribution conduit with working liquid flowing from the upper ends of the buoyancy conduits fed into the upper end of the elongate gravitational distribution conduit and working liquid flowing downwardly through the elongate gravitational distribution conduit being fed from the lower end of the elongate gravitational distribution conduit into the lower ends of the plural elongate buoyancy conduits;
    a liquid turbine system fluidically interposed between the lower end of the elongate gravitational distribution conduit and the lower ends of the plural elongate buoyancy conduits;
    an gas injection system operative to inject gas into the lower ends each of the plural elongate buoyancy conduits;
    a first heat exchanger in fluidic communication with each of the plural elongate buoyancy conduits, the first heat exchanger comprises a first heat exchange fluid;
    a second heat exchanger in fluidic communication with an upper chamber and in fluidic communication with a storage tank; and a thermal heating system configured to capture thermal energy from an external source, the thermal heating system in fluidic communication with the first heat exchanger;

a thermal storage system, the thermal storage system in fluidic communication with the thermal heating system, the thermal storage system configured to store thermal energy captured from the gas-driven generator system, wherein:

the thermal storage system comprises a second heat exchange fluid; and the injection of the gas into the working liquid disposed in the plural elongate buoyancy conduits will tend to induce upward flow of the working liquid in the plural elongate buoyancy conduits such that working liquid fed to the upper end of the elongate gravitational distribution conduit will have a downward flow within the elongate gravitational distribution conduit to actuate the liquid turbine system.

2. The system of claim 1, wherein the thermal heating system comprises solar thermal panels configured to capture thermal energy from solar radiation.

3. The system of claim 2, wherein the thermal heating system comprises a fluid loop containing the first heat exchange fluid for moving thermal energy from the solar thermal panels to the first heat exchanger.

4. The system of claim 1, further comprising:

a third heat exchanger configured to move heat from the gas exiting the upper chamber 1026 to the first heat exchanger.

5. The system of claim 1, wherein:

the gas comprises a first refrigerant;

the gas injection system comprises a third heat exchanger that:

pressurizes the refrigerant in liquid form; and evaporates the refrigerant into a pressurized refrigerant gas prior to being injected into the buoyancy conduit; and the second heat exchange fluid is a second refrigerant.

6. The system of claim 1, wherein the storage tank is in fluidic communication with the gas injection system.

7. The system of claim 5, wherein the first refrigerant and the second refrigerant are the same material.

8. The system of claim 5, wherein the first refrigerant and the second refrigerant are different materials.

9. A gas-driven generator system for generating electric power from movement of a working liquid, the gas-driven generator system comprising:

a gas-driven generator, comprising:

an elongate gravitational distribution conduit with an upper end and a lower end;

plural elongate buoyancy conduits, each buoyancy conduit with an upper end and a lower end;

wherein the upper ends of the elongate buoyancy conduits are in fluidic communication with the upper end of the elongate gravitational distribution conduit; and the lower end of the elongate gravitational distribution conduit is in fluidic communication with the lower ends of the elongate plural buoyancy conduits such that a closed fluid loop is formed between the elongate plural buoyancy conduits and the elongate gravitational distribution conduit with working liquid flowing from the upper ends of the buoyancy conduits fed into the upper end of the elongate gravitational distribution conduit and working liquid flowing downwardly through the elongate gravitational distribution conduit being fed from the lower end of the elongate gravitational distribution conduit into the lower ends of the plural elongate buoyancy conduits;

a liquid turbine system fluidically interposed between the lower end of the elongate gravitational distribution conduit and the lower ends of the plural elongate buoyancy conduits;

a first fluid thermal transfer circuit comprising:

a first heat exchanger in fluidic communication with each of the plural elongate buoyancy conduits, the first heat exchanger comprises a first heat exchange fluid; wherein:

a portion of working fluid in the plural elongate buoyancy conduits is removed from at least one of the plural elongate buoyancy conduits;

the portion of working fluid circulates through the first fluid thermal transfer circuit; and the portion of working fluid is returned to the plural elongate buoyancy conduits;

a second fluid thermal transfer circuit comprising:

a second heat exchanger in fluidic communication with an upper chamber and in fluidic communication with a storage tank;

a gas injection system in fluidic communication with each of the plural elongate buoyancy conduits and in fluidic communication with the second heat exchanger; wherein;

the gas injection system is operative to inject compressed gas into each of the plural elongate buoyancy conduits; and the gas injection system is configured to:

receive refrigerant gas from the second heat exchanger;

transfer heat to the refrigerant gas to form the compressed gas; and inject the compressed gas to each of the plural elongate buoyancy conduits;

a solar thermal heating system in fluidic communication with the first heat exchanger, the solar thermal heating system configured to transfer heat collected by the solar thermal heating system to the first heat exchanger; and a thermal storage system, the thermal storage system in fluidic communication with the solar thermal heating system, the thermal storage system configured to store thermal energy captured from the gas-driven generator system, wherein:

the injection of the compressed gas into the working liquid disposed in the plural elongate buoyancy conduits will tend to induce upward flow of the working liquid in the plural elongate buoyancy conduits such that working liquid fed to the upper end of the elongate gravitational distribution conduit will have a downward flow within the elongate gravitational distribution conduit to actuate the liquid turbine system; and the compressed gas comprises a first refrigerant;

the circulation of the portion of working fluid through the thermal transfer circuit will tend to increase the temperature of the working fluid in plural elongate buoyancy conduits; and the thermal storage system comprises a second heat exchange fluid that is a second refrigerant.

10. The system of claim 7, wherein the thermal storage system comprises a thermal storage medium.

11. The system of claim 10, further comprising:
a third heat exchanger in thermal communication with the thermal storage medium, the third heat exchanger in fluidic communication with the first heat exchanger and in fluidic communication with the solar heating system, wherein:
the third heat exchanger is configured to transfer heat to the thermal storage medium from the first heat exchanger.

12. The system of claim 10, further comprising
a first heat pump in fluidic communication with a condenser, the condenser in thermal communication with the thermal storage medium, the first heat pump in fluidic communication with a radiator, wherein heat is transferred from the condenser to the radiator.

13. The system of claim 12, wherein the first heat pump further comprises:
a compressor in fluidic communication with the condenser and the radiator, wherein:
a heat exchange fluid is transferred from the condenser to the radiator by the compressor.

14. The system of claim 10, further comprising:
a fresh water collection system, the fresh water collection system configured to isolate fresh water from salt water.

15. The system of claim 14, wherein the fresh water collection system further comprises:
a container for the salt water in thermal communication with the thermal storage medium;
a condensing surface configured to condense water vapors to form liquid water; and
a collection vessel that receives the condensed liquid water; wherein the condensing surface is configured to direct the liquid water to the collection vessel.

16. The system of claim 9, wherein the gas injection system comprises a tube and shell heat exchanger.

17. The system of claim 9, wherein the gas injection system comprises a cascading series of heat pump intercoolers.

18. The system of claim 10, wherein the thermal storage medium comprises a phase change material.

* * * * *